United States Patent [19]

Bulger

[11] Patent Number: 4,640,033
[45] Date of Patent: Feb. 3, 1987

[54] ILLUMINATED CHILD'S TRAY

[76] Inventor: Ray P. Bulger, 1900 Primrose, Carrollton, Tex. 75007

[21] Appl. No.: 702,317

[22] Filed: Feb. 15, 1985

[51] Int. Cl.⁴ ............................................. G09F 3/00
[52] U.S. Cl. ........................................ 40/324; 40/564; 40/320
[58] Field of Search .................... 40/324, 564, 320; D15/1

[56] References Cited

U.S. PATENT DOCUMENTS

| D. 153,672 | 5/1949 | Di Giorgio . | |
|---|---|---|---|
| D. 253,786 | 12/1979 | Montague . | |
| 1,066,292 | 7/1913 | Le Furge | 40/320 |
| 1,290,137 | 1/1919 | Economy . | |
| 1,763,476 | 6/1930 | Morris . | |
| 1,786,123 | 12/1930 | Murphy | 40/320 |
| 2,114,460 | 4/1938 | Ziegler . | |
| 2,131,586 | 9/1938 | Dano | 40/320 |
| 2,178,812 | 11/1939 | Schade . | |
| 2,635,681 | 4/1953 | Hiltman | 40/320 |
| 2,971,567 | 2/1961 | Kimmel . | |
| 3,019,331 | 1/1962 | Geist . | |
| 3,185,829 | 5/1965 | Rau . | |
| 3,346,968 | 10/1967 | Dellinger . | |
| 3,415,570 | 12/1968 | Mosley et al. . | |
| 3,510,964 | 5/1970 | Dahners et al. . | |
| 3,705,982 | 12/1972 | Smolinski . | |
| 3,802,708 | 4/1974 | Libert . | |
| 3,884,476 | 5/1975 | Sanders . | |
| 4,321,768 | 3/1982 | Engelhardt . | |

FOREIGN PATENT DOCUMENTS 2276649  6/1974  France ................................. 40/320

Primary Examiner—Gene Mancene
Assistant Examiner—Wenceslao J. Contreras
Attorney, Agent, or Firm—Richards, Harris, Medlock & Andrews

[57] ABSTRACT

A child's food serving tray, such as used on a high chair, which is illuminated to entertain the child and to function as an educational device. The tray surface has various artistic and educational designs which incorporate a plurality of electric lights mounted in the surface. The lights may flash on and off in a predetermined repetitive sequence, or a plurality of manual switches may be provided on the surface of the tray so that the child can selectively control the operation of the lights.

9 Claims, 8 Drawing Figures

ILLUMINATED CHILD'S TRAY

TECHNICAL FIELD

This invention relates to food serving trays, and more particularly to illuminated children's trays used with high chairs.

BACKGROUND OF THE INVENTION

Food serving trays are well known in the prior art and they have been widely used in conjunction with high chairs to assist in feeding children. Serving trays have also been illuminated for purposes such as advertising, providing light in darkened areas, and illuminating the glassware in which drinks are being served at cocktail lounges.

Children's toys have long been illuminated to provide entertainment and educational benefits for children. Such illuminated toys include game tables and playing boards, electronic games, and educational devices which are designed to allow children to interact with them.

Although illuminated toys and serving trays are well known in the prior art, there has been a long-felt need for an effective way to occupy children while they are waiting for their food to be served. High chairs are often used to confine the child so that the adult is free to prepare the food. This has never been entirely satisfactory because the child may become restless and attempt to climb out of the chair, causing the adult to fear the child will fall if the child is not resecured in the chair. The child may be given toys to provide amusement while the food is being prepared, but toys are usually dropped or thrown on the floor and must be picked up by the adult. Such continuous interruptions cause the food preparation to be delayed, which generally adds to the child's restlessness.

The present invention combines the elements of flashing lights and manual switches with a child's serving tray so that the child will be entertained, amused, and educated. Although the invention is especially useful to occupy the child while an adult is preparing food, the illuminated tray makes the high chair an education and amusement center which may be used at any time. The child's tray may be securely attached to the chair so that it cannot be removed and dropped by the child. The switches allow the child to actively interact with the tray, and the artistic designs and flashing lights provide entertainment and amusement at any time.

SUMMARY OF THE INVENTION

The present invention provides a child's food serving tray, such as used on high chairs, with a plurality of electric lights to entertain the child. The surface of the tray includes an artistic scene or other design incorporating the lights which may flash in a predetermined repetitive sequence to amuse the child.

The artistic design on the tray may include various scenes, shapes, patterns, colors, letters, or numbers which incorporate the electric lights. The tray may be provided with a plurality of manual switches so that the child can selectively control the operation of the lights. In this way the child is entertained and educated by learning to correlate various shapes, colors, and symbols through manipulation of the switches. This interaction by the child develops eye-hand coordination as the child learns to identify various colors and symbols.

The invention also provides a multiplicity of interchangeable overlays to change the scene or design of the tray's surface for a given arrangement of lights. Thus the consumer may purchase one complete unit and then extend its usefulness by purchasing interchangeable overlays of different designs which incorporate the same light pattern.

The artistic design may be in the form of a simple game whereby the child operates the switches in a sequence in response to the visual cues provided by the lights. This game sequence may involve colors, shapes, numbers, or other symbols highlighted by the electric lights. The tray also may include a microprocessor unit to provide a more complex light flashing sequence and a more challenging and interesting response to the child's interaction through the switches.

The invention is also suitable for hotel or restaurant high chairs and for children's trays which may be attached to airplane fold down tray tables. The artistic design may include the restaurant's, hotel's, or airline's logo or other design which incorporates the electric lights. The lights may be programmed to light continuously or flash in a variety of patterns and sequences according to the needs of the commercial purchaser.

The trays may be manufactured out of wood or plastic and may include a variety of light patterns and switches. Also, each tray may include its own power source, typically in the form of standard replaceable batteries.

BRIEF DESCRIPTION OF THE DRAWINGS

For a more complete understanding of the present invention and for further advantages thereof, reference is now made to the following Description of the Preferred Embodiments taken in conjunction with the accompanying Drawings, in which.

DESCRIPTION OF THE PREFERRED EMBODIMENTS

Figure 1:
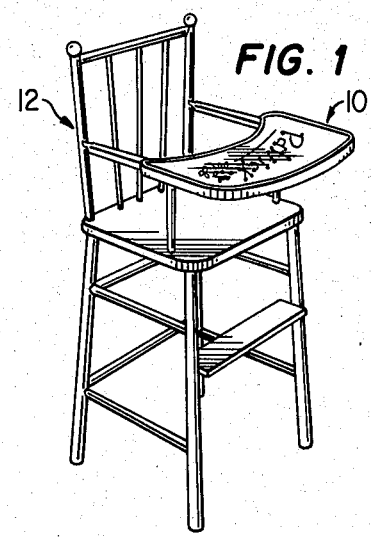
FIG. 1 illustrates a serving tray of the present invention mounted on a child's high chair.

Referring to the Drawings, FIG. 1 illustrates a serving tray 10 of the present invention mounted on a child's high chair 12. Serving tray 10 is adaptable to most high chairs so that a consumer already having a high chair needs to purchase only the serving tray 10.

Figure 2:
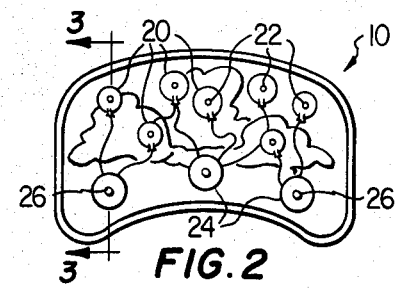
FIG. 2 illustrates an artistic design of the present invention incorporating lights and manual switches.

FIG. 2 illustrates an embodiment of serving tray 10 which depicts an artistic design of colored pictorial balloons 20 against a background of white clouds on the surface of serving tray 10. At the center of each balloon 20 is an electric light 22. Below the balloons are colored areas 24, each colored area corresponding to the color of the balloons 20 pictorially connected to it. Each colored area 24 has a manual switch 26 which controls the illumination of the electric lights 22 in the balloons 20.

Figure 3:
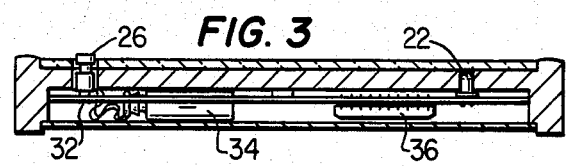
FIG. 3 is a cross-sectional view of the tray of FIG. 2 taken along the section 3—3.

FIG. 3 is a cross-sectional view of serving tray 10 taken along section line 3—3 of FIG. 2. Manual switch 26 and electric light 22 are connected by electrical circuit means 32 to power source 34. Electrical circuit means 32 may also include microprocessor 36 which may be programmed to provide a complex light illumination sequence automatically or in response to operation of the manual switches 26. Electric lights 22 thus may be programmed to illuminate continuously, flash repetitively, or illuminate in various different sequences to provide entertainment for the child. The microprocessor 36 also allows the child to interact with the device in performing educational exercises using the electric lights 22 and manual switches 26.

Figure 4:
FIGS. 4, 5, and 6 illustrate various artistic designs of the present invention.
Figure 5:
Figure 6:
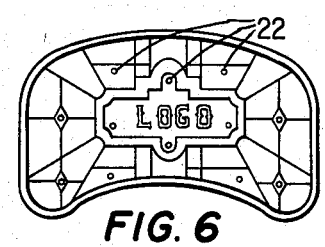

Serving tray 10 has many embodiments which provide different artistic designs and different placement of electric lights 22 on the surface of serving tray 10. FIG. 4 illustrates an artistic design depicting a farm yard school house. FIG. 5 illustrates the use of electric lights 22 as part of a personalized design incorporating the child's name. FIG. 6 illustrates a design which incorporates a commercial logo, such as that of a restaurant, hotel, or sports team, along with electric lights 22.

Figure 7:
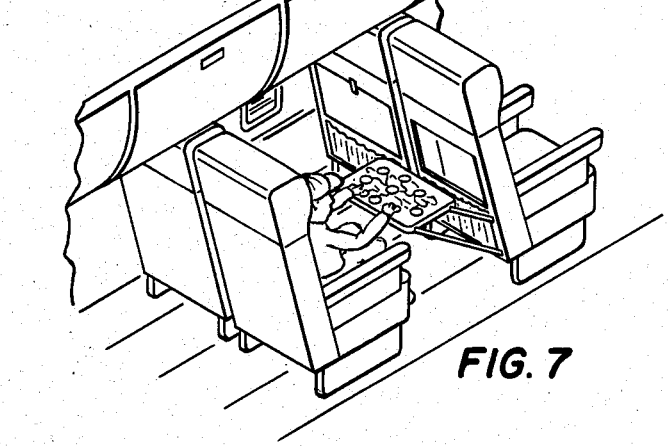
FIG. 7 illustrates the present invention used in conjunction with an airplane fold down tray table.

FIG. 7 illustrates an embodiment of the present invention designed to be utilized in conjunction with a fold down tray table on the back of an airplane seat.

Figure 8:
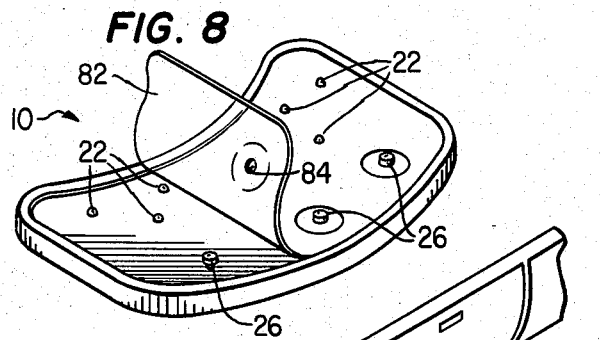
FIG. 8 illustrates the use of an overlay to change the design of the tray.

The present invention includes a multiplicity of different designs which include games, educational exercises, and commercial logos. A consumer may wish to purchase only one serving tray 10 for each child but may not want to be limited to one artistic design. FIG. 8 illustrates the use of an overlay 82 for serving tray 10. Overlay 82 provides a different design from that on the surface of serving tray 10. Overlay 82 is provided with holes 84 to allow manual switches 26 to protrude through the overlay 82 when it is in place on serving tray 10. Overlay 82 may be transparent at the location of the electric lights 22 in the surface of serving tray 10, or overlay 82 may have additional holes at the location of electric lights 22. The use of overlay 82 provides the consumer with an inexpensive way to make serving tray 10 more interesting and entertaining for the child because of the multiplicity of interchangeable designs available.

Although several embodiments of the present invention have been illustrated and described, it is understood that the invention is not limited to the precise details herein illustrated and described since numerous design alterations and structural modifications are contemplated as being part of the invention herein disclosed and claimed.

I claim:
1. An illuminated tray comprising:
a tray surface having an artistic design thereon;
a plurality of electric lights mounted within said tray surface;
an electrical power source located within the tray; and
electrical circuit means connecting said power source to said electric lights, wherein the electrical circuit means includes a plurality of manual switches mounted on said tray surface, said manual switches selectively controlling the illumination of said electric lights.

2. An illuminated tray comprising:
a tray surface having an artistic design thereon;
a plurality of electric lights mounted within said tray surface;
an electrical power source located with the tray; and
electrical circuit means connecting power source to said electric lights, wherein the electrical circuit means futher includes a microprocessor which illuminates said electric lights in complex sequences in response to operation of said manual switches.

3. An illuminated tray comprising:
a tray surface having an artistic design thereon;
a plurality of electric lights mounted within said tray surface;
an electrical power source located within the tray; and
electrical circuit means connecting said power source to said electric lights, further comprising a multiplicity of interchangeable overlays of various designs which overlay said tray surface.

4. An illuminated child's tray comprising:
a tray surface having an artistic design thereon;
a plurality of electric lights mounted within said tray surface;
an electrical power source located within the tray; and
electrical circuit means connecting said power source to said electric lights, said electrical circuit means including a plurality of manual switches and a microprocessor to control the illumination of said electric lights.

5. The illuminated child's tray of claim 4 wherein the tray is a child's high chair tray.

6. The illuminated child's tray of claim 4 wherein the tray is removeably attachable to an airplane seat's fold down tray table.

7. The illuminated child's tray of claim 4 further comprising a multiplicity of interchangeable overlays of various designs which overlay said tray surface.

8. The illuminated child's tray of claim 4 wherein the artistic design is the logo of a commercial organization.

9. The illuminated child's tray of claim 4 wherein the artistic design incorporates said electric lights in an educational exercise.

* * * * *